United States Patent

Olds et al.

[15] 3,683,238

[45] Aug. 8, 1972

[54] PIVOTALLY SUPPORTED RACK CONSTRUCTION

[72] Inventors: Richard G. Olds, Garden City; Eugene P. Bonzack, Livonia, both of Mich.

[73] Assignee: Westinghouse Electric Corporation, Pittsburgh, Pa.

[22] Filed: Feb. 11, 1971

[21] Appl. No.: 114,509

[52] U.S. Cl. ............................317/118, 317/101 DH

[51] Int. Cl. ...............................................H02b 1/06

[58] Field of Search ...317/117, 101, 101 D, 101 DH, 317/101 CB, 118; 211/167–169.1, 41

[56] References Cited

UNITED STATES PATENTS

| | | | |
|---|---|---|---|
| 2,928,555 | 3/1960 | Childs et al. | 317/101 D X |
| 3,376,479 | 4/1968 | Wines et al. | 317/101 DH X |
| 3,492,538 | 1/1970 | Fergusson | 317/101 DH |
| 3,274,449 | 9/1966 | Pioch | 317/101 DH |
| 3,008,113 | 11/1961 | Johnson | 317/101 DH X |
| 3,278,714 | 10/1966 | Bernutz | 317/101 DH X |
| 3,188,524 | 6/1965 | Williams | 317/101 DH |

*Primary Examiner*—Lewis H. Myers
*Assistant Examiner*—U. Weldon
*Attorney*—Clement L. McHale and A. T. Stratton

[57] ABSTRACT

An electrical control cabinet in which a rack for electronic circuit boards is pivotally supported for swinging movement from an upright operative position to a horizontally extending position to facilitate servicing the terminal connections at the rear face of the rack. The rack consists of a frame made up of a plurality of vertically and horizontally extending rails on which the circuit card mounting blocks are secured. Keying blocks are mounted on the rails at selected locations to prevent improper insertion of a circuit card on the rack.

7 Claims, 4 Drawing Figures

PATENTED AUG 8 1972

3,683,238

INVENTORS
RICHARD G. OLDS
EUGENE P. BONZACK

BY Barnes, Kisselle, Raisch & Choate
ATTORNEYS

INVENTORS
RICHARD G. OLDS
EUGENE P. BONZACK
BY

Barnes, Kisselle, Raisch & Choate,
ATTORNEYS

INVENTORS
RICHARD G. OLDS
EUGENE P. BONZACK
BY
Barnes, Kisselle, Raisch & Choate
ATTORNEYS

PIVOTALLY SUPPORTED RACK CONSTRUCTION

This invention relates to electrical control panels and, more specifically, to control panels of the type comprising a plurality of electronic circuit cards removably mounted on a rack having a plurality of mounting blocks thereon adapted to interconnect the various circuits on the circuit cards with one another, with power sources and with electrically controlled components of a device, such as a machine tool.

In control panels of the type described the mounting blocks are normally provided with sockets in the front face thereof in which the electronic circuit cards are engaged. Within the sockets of the mounting blocks are arranged contacts which are electrically connected with terminals projecting from the rear side of the mounting blocks. The terminals at the rear of the mounting blocks are connected by wires with other terminals on the same or other mounting blocks and also with other terminals within the control panel connected with power sources and electrically controlled components.

In servicing such control panels access to the terminals at the rear side of the mounting blocks is frequently required. If the cabinet in which the control panel is mounted does not have an access panel at the rear side thereof, then it becomes necessary to mount the rack which supports the card mounting blocks in the control panel in a manner which enables access to the rear side of the rack.

The present invention has for an object the provision of a rack construction for such mounting blocks which enables the rear side of the rack to be readily accessible.

A further object of the invention resides in a rack construction for such card mounting blocks which not only renders the rear side of the rack accessible but also reduces the space requirements of the cabinet for the control panel to a minimum.

Another object of the invention resides in the provision of a rack construction for such card mounting blocks which accommodates the selective location of a plurality of keying elements adapted to cooperate with slots in the electronic circuit cards to prevent insertion of a card in the wrong socket of a mounting block.

Figures 1, 4:
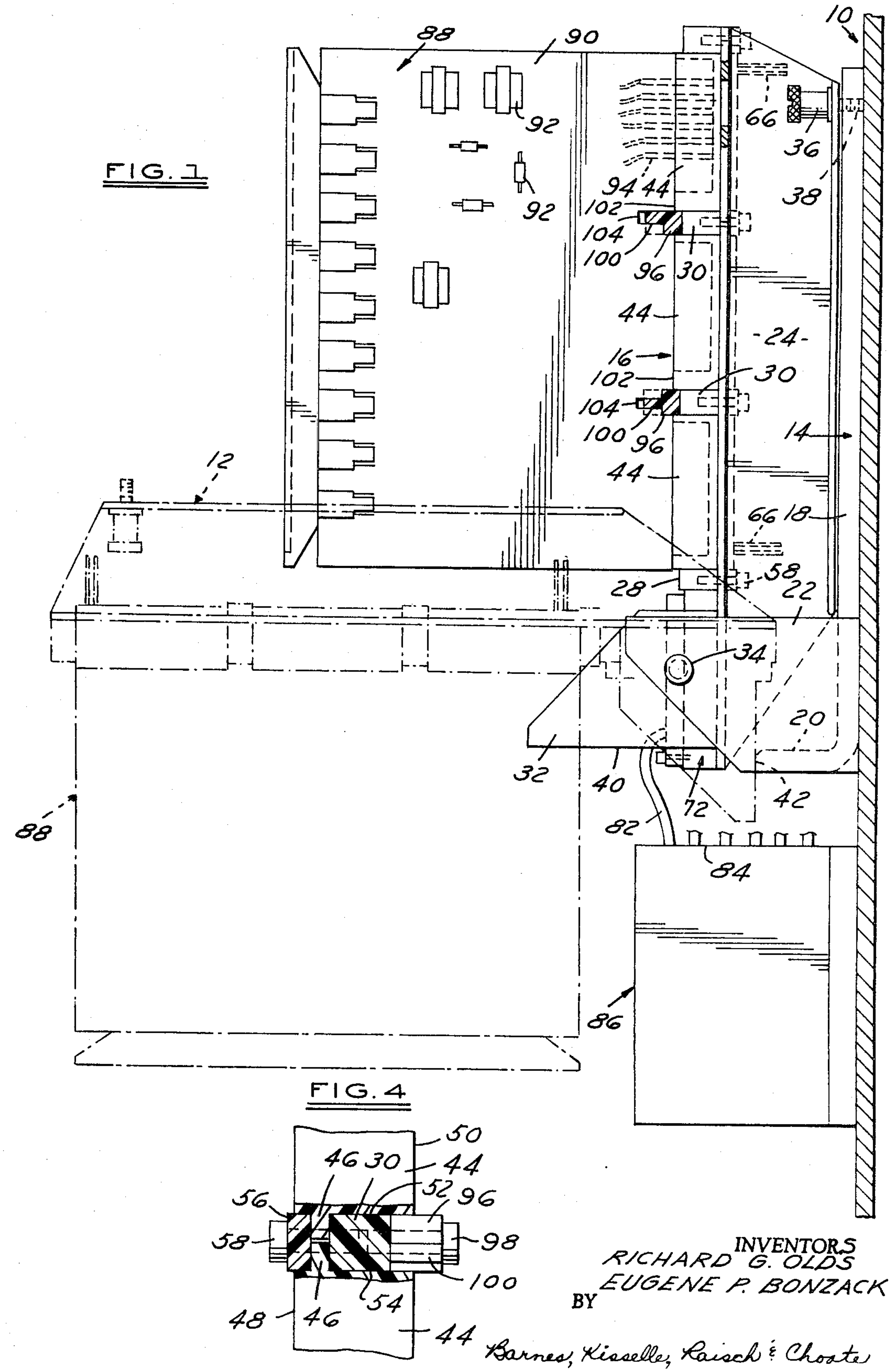
FIG. 1 is a fragmentary sectional view of a cabinet for a control panel showing the rack in its normal operative position in solid lines and showing the rack in a position for servicing in broken lines.
FIG. 4 is a sectional view along the line 4—4 in FIG. 3.

In FIG. 1 the rear wall of a cabinet for a control panel is designated 10. The cabinet would normally include side walls, top and bottom walls, a front wall and an access door which are not illustrated. The rack of the present invention is generally designated 12 and includes a support frame 14 and a mounting block frame 16. Support frame 14 comprises two vertical straps 18 securely mounted on the rear wall 10 of the cabinet. At their lower ends each strap 18 is fashioned with a forwardly projecting leg 20 on which a forwardly projecting mounting bracket 22 is secured as by welding or the like.

The mounting block frame 16 comprises a pair of vertically extending channel shaped side rails 24 which are interconnected at their upper ends by a horizontally extending support rail 26 and at their lower ends by a horizontally extending support rail 28. Side rails 24 are also interconnected by intermediate horizontally extending rails 30. Adjacent their lower ends each side rail 24 has secured thereto (as by welding or screws) a support bracket 32. Each support bracket 32 is pivotally mounted on its adjacent mounting bracket 22 as by a pin 34. Frame 12 is adapted to be retained in the upright position illustrated in solid lines in FIG. 1 by screws 36 engaging the rear flanges of side rails 24 and threaded into openings at the upper ends of straps 18 as at 38. When screws 36 are loosened frame 12 is adapted to be pivoted from the upright position to the horizontal position shown in broken lines in FIG. 1. In this position the lower edge 40 of each support bracket 32 abuts the forward end 42 of each leg 20 to retain frame 12 in the horizontal position.

Between side rails 24 there are mounted on frame 12 a plurality of mounting blocks 44. Mounting blocks 44 are provided with vertically projecting flanges 46 along the upper and lower ends thereof which are spaced intermediate the front and rear faces of the mounting blocks. As shown in FIG. 4, flanges 46 are located closer to the rear face 48 of each mounting block than from the front face 50 thereof. Flanges 46 have a vertical dimension such that when two blocks 44 are in vertically abutting relation the space between the bottom wall 52 of one block and the top wall 54 of the next lower block corresponds to the width of a rail such as 26,28,30. Thus flanges 44 define grooves between vertically adjacent blocks in which the rails are seated. These flanges also define grooves for rear rails 56 behind each of the rails 26,28,30. Screws 58 extend through the rear rails 56 through openings in the abutting flanges 46 and thread into the front rails 26,28,30 so that blocks 44 are retained in a vertically stacked position by the clamping action of these rails on flanges 46.

In order to prevent vertical separation of the vertically adjacent mounting blocks which might result from lengthwise bowing of rails 26,28,30 the entire mounting block assembly is clamped together vertically by long screws 60 extending from top rail 26 down through lower rail 28. The side faces of blocks 44 are grooved to accommodate screws 60. Thus in the arrangement illustrated the mounting blocks 44 are clamped together in horizontally extending rows by rails 24 and rails 26, 28,30. The blocks are located in a fixed fore and aft position by rails 26,28,30 on the front sides thereof and rear rails 56. The blocks are also clamped together vertically by screws 60 so that the frame 12 comprises a relatively rigid structure wherein the mounting blocks 44 are relatively rigidly and accurately positioned.

Each mounting block is fashioned on the front face thereof with a plurality of horizontally spaced and vertically extending sockets 62. Within each socket 62 there are arranged vertically spaced spring contacts 64. Each of the contacts 64 is electrically connected with a pin or terminal 66 projecting rearwardly from the rear face of the mounting block (FIG. 1).

Figure 2:
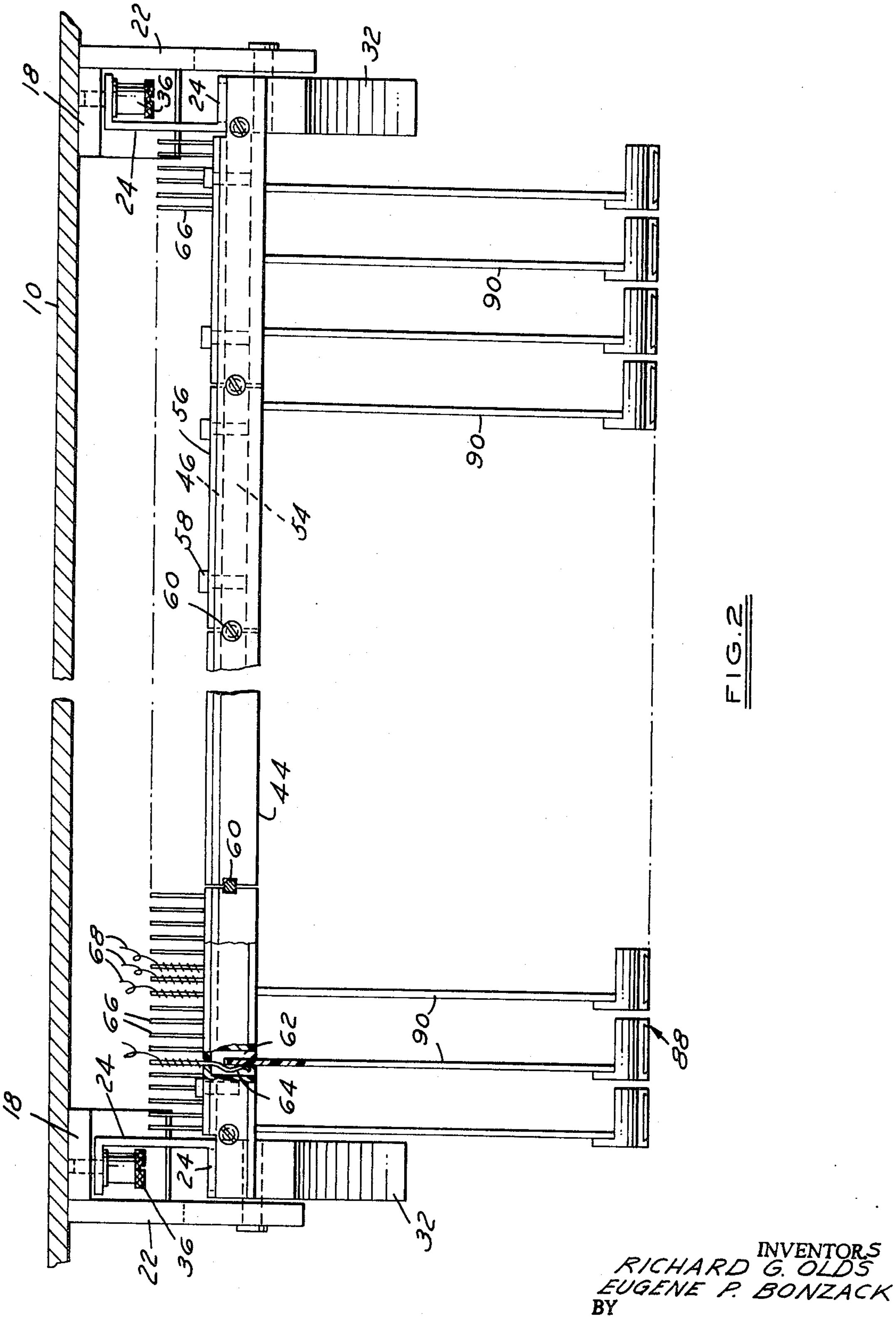
FIG. 2 is a top view of the rack illustrated in FIG. 1.

Terminals 66 are connected by wires 68 (FIG. 2) with the other terminals 66 on the same or other blocks 44 or with selected ones of terminals 70 on a terminal board 72 which extends horizontally along the lower edge of frame 12 between support brackets 32.

Terminal board 72 comprises a horizontal row of terminal blocks 74 which are mounted on frame 12 by screws 76 which thread into horizontally extending upper and lower support rails 78. At each end thereof rails 78 are secured to the front flanges of side rails 24 by screws 80.

Selective terminals 70 on terminal board 72 have conductors 82 connected thereto and extending downwardly through the top wall 84 of a bus box or channel 86. Bus box 86 is located on rear wall 10 of the control cabinet directly below rack 14 as shown in FIG. 1. It projects forwardly from rear wall 10 only slightly beyond the front faces of mounting blocks 44 and terminal board 72. It is spaced below rack 12 a distance substantially only sufficient to enable extending wires 82 upwardly through the top wall 84 of the terminal box to terminals 70 on terminal board 72.

An electronic circuit card is generally designated 88. Each circuit card comprises a flat board 90 usually formed of a glass phenolic material. A plurality of electrical components 92 are mounted on board 90 and are electrically connected together by conductive paths on the card to form one or more electronic circuits. These circuits are in turn connected to horizontally extending conductive strips 94 spaced apart vertically along the rear edge of board 90.

The vertical spacing of strips 94 corresponds to the vertical spacing of contacts 64 in mounting blocks 66. Thus, when a circuit card 88 is inserted into the vertically aligned sockets 62 of mounting blocks 44, strips 94 make electrical contact with contacts 64 to establish electrical connection between the circuits connected to terminals 66 and the circuits connected to strips 94.

Figure 3:
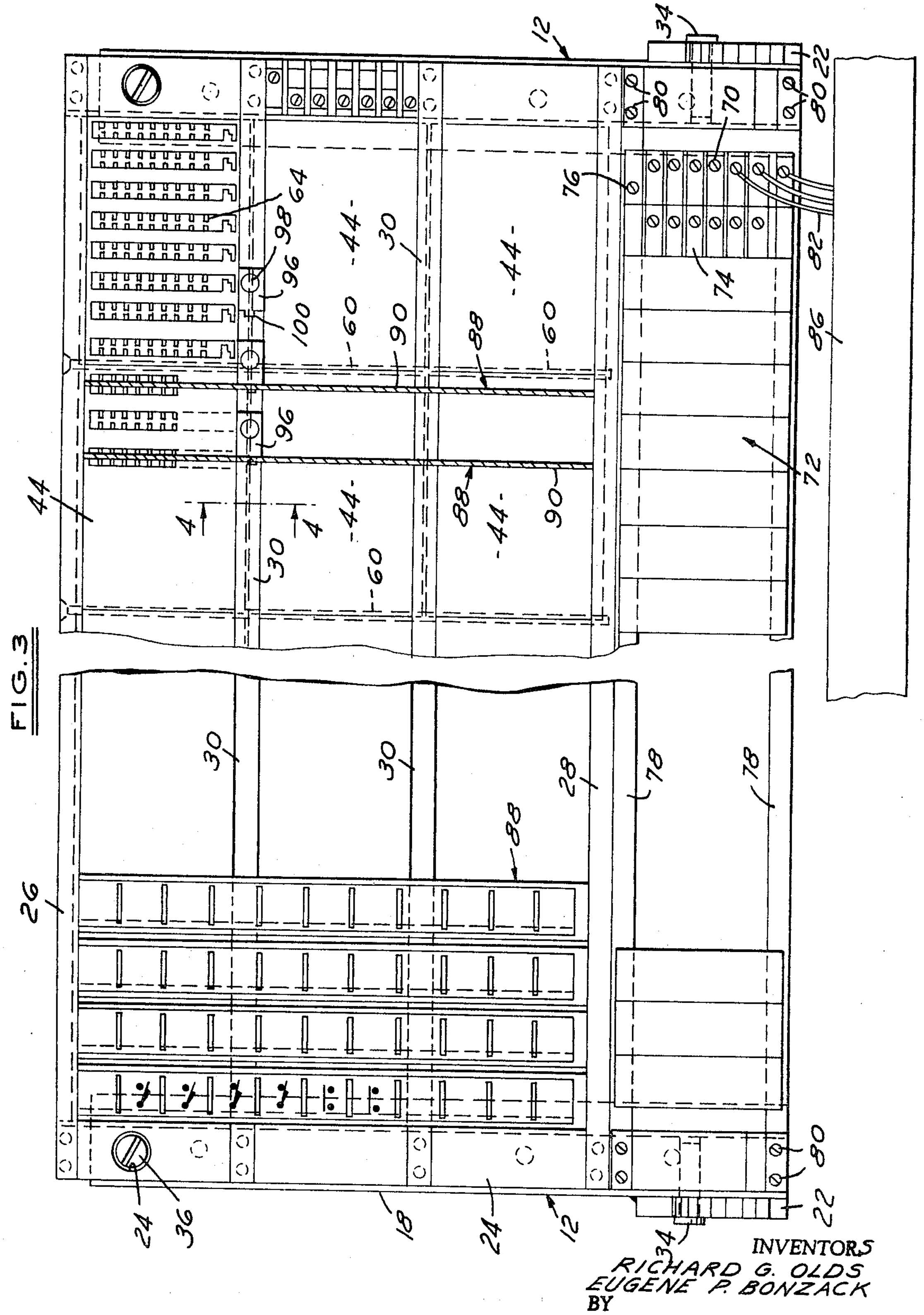
FIG. 3 is a front view of the control panel illustrated in FIG. 1.

In control panels of this type it is extremely important that a circuit card 88 be insertable only in a selected one or more of slots 62. In the rack construction of this invention this is assured by a relatively inexpensive but highly effective keying arrangement. This keying arrangement includes a plurality of keying blocks 96 (FIGS. 1 and 3) which are seated on the outer faces of the intermediate rails 30 on frame 12. Blocks 96 are secured to rails 30 by screws 98. Each block 96 has a horizontal tab extension 100 which is vertically aligned with a corresponding slot 62 in mounting blocks 44. Keying blocks 96 are formed as a series of blocks with the tabs 100 varying in thickness as well as in position vertically relative to the width of the rails 30 on which the blocks are mounted. Thus, as shown in FIG. 1, tab 100 of the upper keying block 96 is relatively thick and disposed along the upper edge of rail 30 whereas tab 100 of the lower keying block 96 is relatively thin and disposed generally vertically centrally of its rail 30. Each board 90 of circuit cards 88 is formed with a pair of vertically spaced notches 102 extending horizontally inwardly from the rear edge thereof. Notches 102 span the solid portions of blocks 44 between vertically aligned slots 62. Notches 102 have forward extensions 104 which are sized and positioned to inter-fit with the tab extensions 100 of the associate keying block 96. Thus, in order to fully insert a circuit card 88 in any one set of vertically aligned slots 62 of mounting blocks 44 it is essential that the slot extension 104 on the card register vertically with the tab extension 100 on the two keying blocks 96. This positively prevents insertion of a circuit card 88 into an improper slot 62 on mounting blocks 44.

Referring to FIG. 1, it will be noted that since terminal blocks 44 are located above pivot pins 34 and since the circuit cards 88 extend forwardly from mounting blocks 44, when frame 12 is pivoted downwardly to the broken line position shown in FIG. 1 the circuit cards clear bus box 86. Nevertheless the space required for this clearance is efficiently utilized by terminal board 72, thus reducing to a minimum the vertical dimension required for accommodating both rack 14 and bus box 86. At the same time when frame 12 is pivoted to the horizontal position the terminals 66 at the rear of mounting blocks 44 are oriented to a vertically projecting position in a horizontal plane in which position they are readily accessible for servicing purposes.

We claim:

1. In an electrical control panel the combination comprising means forming a vertically extending support surface, a mounting bracket structure having a mounting face adapted to be secured against said support surface, said mounting bracket structure having a pair of horizontally axially aligned pivot supports, a rack, having a lower edge, said rack being pivotally supported adjacent said lower edge on said pivot supports for pivotal movement from an operative position wherein the rack extends generally parallel to said support surface to a service position wherein the rack extends generally perpendicular to said support surface, said rack including card mounting blocks having upper and lower ends and having a plurality of vertically extending horizontally spaced rows of contacts, as disposed in said operative position, thereon for directly engaging and supporting on the front face thereof a plurality of electrical circuit cards, requiring substantially no other means of support than said contacts, such that each card extends vertically in a plane generally perpendicular to the plane of the rack when in said service position, said mounting blocks having a plurality of terminals on the rear faces thereof, at least two vertically adjacent mounting blocks being required for receiving and supporting any one card, conductors at the rear of said mounting blocks interconnecting at least some of said terminals, said rack also having a terminal board thereon, other conductors extending from the terminals on the rear face of said block to said terminal board and means for retaining said rack in said operative position.

2. The combination called for in claim 1 wherein said terminal board extends horizontally adjacent the lower end of said rack.

3. The combination called for in claim 2 including a bus box mounted on said support surface and extending horizontally below said terminal board and a plurality of conductors extending from within said bus box to said terminal board.

4. The combination called for in claim 3 wherein said pivot supports are spaced below the lower ends of said mounting blocks.

5. The combination called for in claim 4 wherein said bus box projects forwardly from said support surface a distance less than the sum of the distances between said pivot supports and said support surface and between said pivot supports and the lower ends of said mounting blocks.

6. A rack for receiving a plurality of electronic circuit cards comprising a pair of upright side walls, a plurality of horizontally extending and vertically spaced support rails fixedly connected at opposite ends to said side rails, a plurality of circuit card mounting blocks having front faces and being mounted in horizontal rows on said rails, at least two vertically adjacent mounting blocks being required for receiving and supporting any one card said mounting blocks having vertically extending sockets in the front faces thereof for receiving the circuit cards, vertically spaced contacts in said sockets adapted to frictionally engage terminal strips on said cards when the cards are inserted therein and keying blocks mounted on said rails between vertically adjacent mounting blocks, said keying blocks corresponding in shape and location with notches on said cards so as to interfit therewith and thereby permit insertion of said cards into said sockets to interengage said contacts and terminal strips.

7. The combination called for in claim 6 wherein said keying blocks project forwardly beyond the front faces of said mounting blocks.

* * * * *